United States Patent

Brady et al.

[11] Patent Number: 5,565,110
[45] Date of Patent: Oct. 15, 1996

[54] DRUM FILTER SHOWER ROLL

[75] Inventors: C. Lamar Brady, Selma; Gary E. Keller, Mobile, both of Ala.

[73] Assignee: International Paper, Purchase, N.Y.

[21] Appl. No.: 444,777

[22] Filed: May 19, 1995

[51] Int. Cl.⁶ .......................... B01D 37/00; B01D 33/073
[52] U.S. Cl. .......................... 210/770; 210/772; 210/784; 210/396; 210/402; 210/406; 210/407; 210/408; 162/56; 100/73; 100/90; 100/121
[58] Field of Search .................. 162/56; 100/73, 100/90, 121; 210/768, 770, 772, 784, 402, 406, 396, 407, 408

[56] References Cited

U.S. PATENT DOCUMENTS

| | | |
|---|---|---|
| 2,431,009 | 11/1947 | Young . |
| 2,696,148 | 12/1954 | Hornbostel ............................ 100/90 |
| 2,711,359 | 6/1955 | Johansen . |
| 3,454,970 | 7/1969 | Sutherland . |
| 3,878,698 | 4/1975 | Eriksson et al. ........................ 100/121 |
| 4,205,541 | 6/1980 | Zucker . |
| 4,737,277 | 4/1988 | Lenac . |
| 4,769,986 | 9/1988 | Kokkonen . |
| 4,795,558 | 1/1989 | LaValley . |

*Primary Examiner*—Robert J. Popovics
*Attorney, Agent, or Firm*—Michael J. Doyle

[57] ABSTRACT

A method and apparatus for improving the operation of a vacuum drum filter. A hollow and perforated shower roll is located at the top of a vacuum drum apparatus for drying and cleaning paper pulp. The interior of the shower roll is provided with a liquid distribution pipe having a plurality of spaced openings therealong, the pipe also having a substantially vertically extending dam which extends radially to adjacent the lower interior surface of the shower roll. In operation, rotation of the vacuum drum in a vat of paper pulp to be dewatered results in the continuous formation of layer of pulp on its exterior surface, the layer being compressed by the shower roll at the nip between the vacuum roll and the shower roll. Concurrently, the shower roll discharges or exudes water onto and into the pulp layer at the nip.

9 Claims, 3 Drawing Sheets

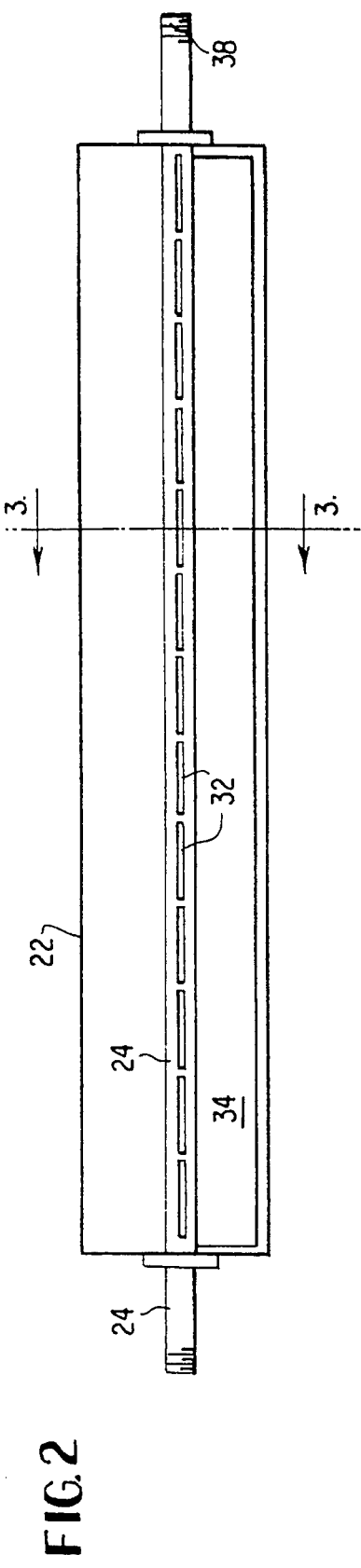
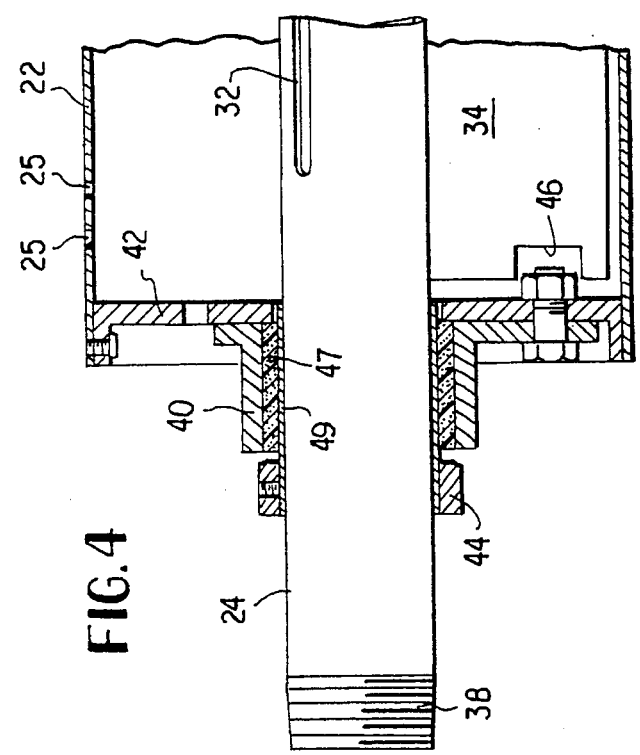
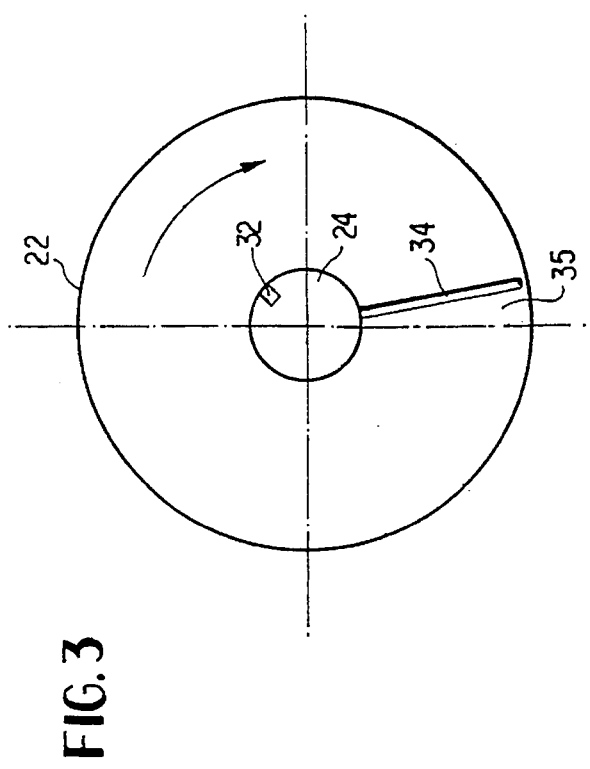

DRUM FILTER SHOWER ROLL

BACKGROUND OF THE INVENTION

This invention relates to a pulp washing apparatus of the type including a vacuum drum rotating horizontally about its longitudinal axis. Such drums are perforated and partially immersed in a fluid medium defined by paper pulp. As one portion of the drum continually rotates out of the pulp, pulp is adhered to the drum exterior surface by the vacuum in the drum interior. This vacuum also functions to draw some of the water from the pulp. At a downstream angular location on the drum surface, a doctor blade is positioned to scrape off the partially dried or partially de-watered pulp mat.

Conventional vacuum drum filters are designed to wash pulp by displacing the fluid carrier (water) through the pulp mat with cleaner water and to discharge the pulp at uniform consistency. The driving force may be a vacuum created by a gravity induced drop leg from the drum filter to a service tank approximately 30 feet below. As the water is pulled into the drum deck by vacuum, a significant amount of air (about 50% of total hydraulic flow) is introduced into the washer system. Reducing the air volume passing through the pulp mat increases the vacuum and can improve the water removal potential of a particular washer. This results in improved efficiency for an overloaded washer or increased capacity for one that is not.

There are inherent variations in displacement efficiency and mat dryness across the width of any conventional vacuum drum filter. This is due mainly to the unevenness of the pulp mat profile, i.e., its variable thickness. Poor inlet vat delivery, uneven shower flow across the drum face, and unbalanced shower flows are typical factors that can affect the mat profile and uniformity. Any improvement in mat uniformity would make the recovered pulp cleaner, this being a primary goal of the drum filter.

It is already known to compress the pulp cake or mat on the exterior surface of a vacuum drum, as shown for example in U.S. Pat. No. 4,737,277 issued to Lenac Apr. 12, 1988, hereby incorporated by reference. However, the Lenac vacuum expression belt 24 does not supply wash water to the pulp mat or cake. His belt 24 merely squeezes or compresses the mat. Further, in such an arrangement, the belt contacts and squeezes the pulp cake or mat on the vacuum drum over an appreciable angular extent and thus the nip pressure is limited to the weight of his endless belt arrangement supported over a relatively large area.

SUMMARY OF THE INVENTION

According to this invention air is removed from the pulp mat by compressing it with a perforated rotating shower roll, thus closing a portion of the air passageways in the mat. The result is improved hydraulic capacity of the filter. During this step, the mat profile across the filter width is evened so that variations in displacement efficiency and mat dryness are reduced. Wash water is continuously applied from inside of the shower roll while the shower roll presses the pulp mat to thereby simultaneously press and wash the pulp mat or cake. The compressing action of the shower roll in contact with the pulp mat, concurrently with mat washing, provides a pumping action which forces the water from the shower roll into the mat while simultaneously displacing the dirtier water in the mat into the rotating filter drum. The squeezed pulp mat becomes partially sealed and hence less air is permitted to pass through the mat into the rotating filter drum. The thickness of the squeezed mat is evened out across the filter width, which improves the variation in moisture and cleanliness of the discharged pulp mat.

A rotating perforated roll, located at the 12 o'clock position, compresses the pulp mat on an operating drum filter while simultaneously applying cleaner wash water from inside the roll directly ahead of the compression nip. The weight of the roll assembly provides the compressive force along the nip. The flooded nip created by the wash water generates a pumping action which displaces the dirtier water in the pulp mat. Also, a smooth uniform profile results after passing the nip. The pulp is discharged into a repulper for the next operation.

The shower roll, also referred to as the nip wash roll, is, typically, a 12 inch diameter perforated roll of the same width as the corresponding vacuum drum filter on which it is mounted. This shower roll is wrapped with a wire mesh. The mesh helps to disperse the shower water and provides traction to rotate the nip wash roll upon its contact with the pulp mat. A similar wire mesh on the vacuum drum exterior also functions a membrane to inhibit clogging of the vacuum openings therein.

A smaller diameter hollow pipe, a shower pipe, is located in the center of the shower roll, the former functioning as a shaft for the shower roll and wash water distributor. This shower pipe supports the larger perforated shower roll by two bearing assemblies, one on each end. The perforated shower roll is permitted to rotate while the shower pipe remains stationary. The shower pipe has a series of slits along its length, which correspond closely to the width of the drum filter. These slits are designed to distribute the shower water evenly across the filter face.

The bearing housings rotate with the perforated shower roll. The inner portions of the bearings remain stationary with the shower pipe. Each end of the shower pipe is held by a bracket which is connected to a lever or pivot arm, the latter typically 12 inches long. The lever arm is mounted to the drum filter side splash panels. During operation, the nip wash roll assembly is permitted to move vertically upwardly and downwardly by virtue of the action of the pivot arm.

An air cylinder (fluid motor) is attached at each side of the roll assembly to provide the lifting power to raise the shower roll to an unload position. The cylinders are balanced to act in harmony by making the supply and discharge tubing runs symmetrical. An air regulator can be used to vary the nip loading by allowing supply air pressure to the cylinders to operate at a controlled setpoint. For example, if the nip load is too high when the roll is in the run position, adding 10 psi of pressure from the regulator can reduce the total nip load by several hundred pounds. The gap between the shower roll assembly and the drum filter face can be adjusted so that metal to metal contact is precluded. The maximum pressure exerted by the shower roll on the nip is derived from the weight of the shower roll and may be lessened by upward force of the air cylinders.

BRIEF DESCRIPTION OF THE DRAWINGS

FIG. 2 is a side sectional view of the shower roll shown at the top of FIG. 1.

FIG. 3 is a view taken along section 3—3 of FIG. 2.

FIG. 4 is an enlarged sectional view of the left portion of FIG. 2.

DETAILED DESCRIPTION OF THE INVENTION

Figure 1:
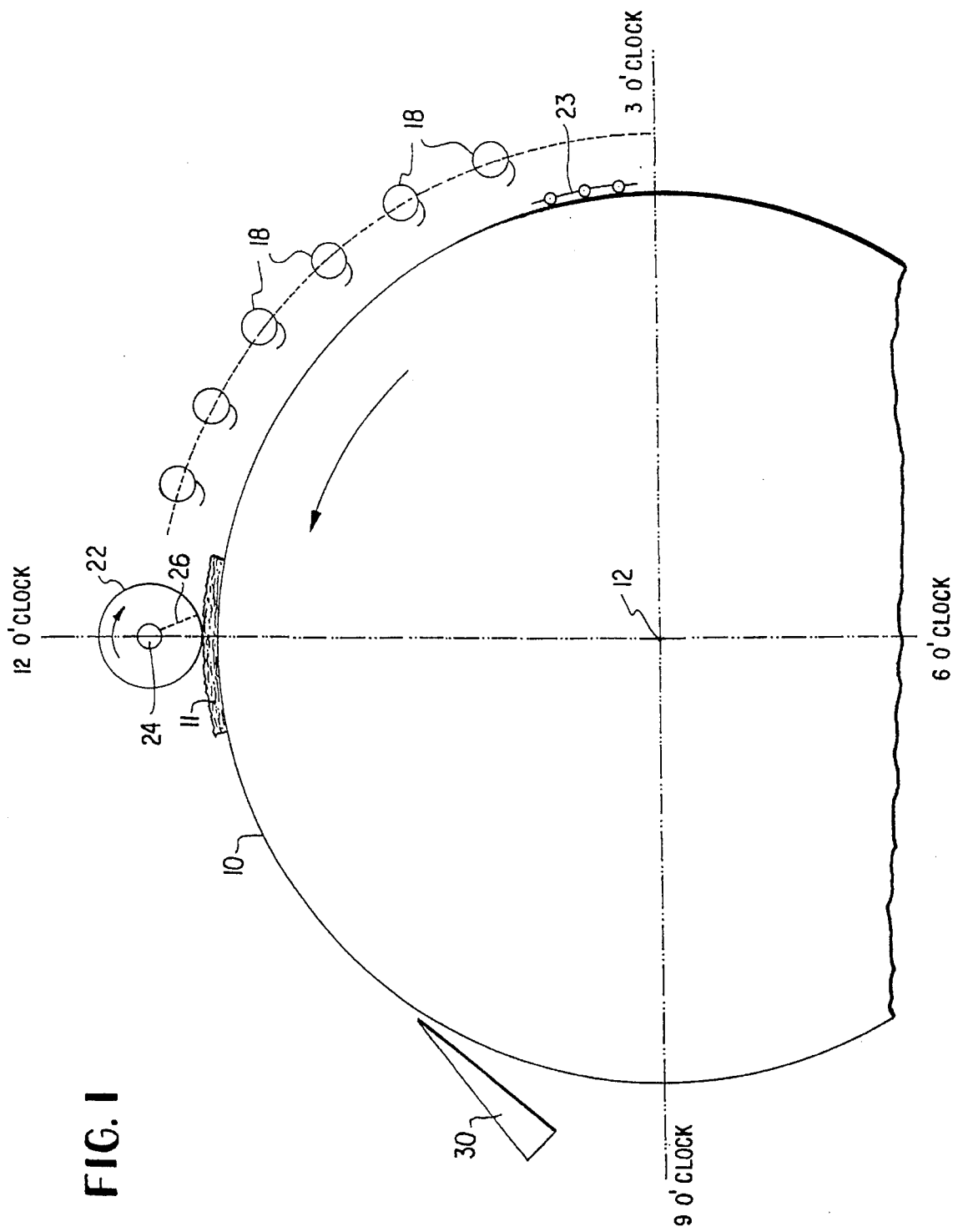
FIG. 1 is a partially schematic sectional view taken transversely to the longitudinal axis of a vacuum drum.

Referring to FIG. 1, a conventional perforated rotary vacuum drum 10 turns about its longitudinal axis 12, the drum being partially immersed in a vat or tank (not shown) containing paper pulp which is to be partially dewatered. A portion only of a mat or cake of paper pulp adhered to the drum exterior surface is shown and is denoted as 11, similar to filter cake or mat 26 of the noted Lenac patent. A series of angularly spaced shower headers 18 is spaced along a portion of the drum surface. For ease in reference certain angular locations around the drum are denoted as corresponding to clock positions. An elongated and perforated shower roll 22 is at the 12 o'clock position and rotates about a non rotating hollow pipe 24, with an elongated plate or dam 34 fastened to and extending radially outwardly from pipe 24. Typically, dam 34 is tilted slightly forwardly from the vertical. The axes of rotation of drum 10 and shower roll 22 are parallel. A wire mesh, only partially shown and denoted as 23, covers the drum surface, as conventional.

A doctor blade 30 is located angularly downstream from the shower roll and before the 9 o'clock position. The doctor blade is located within an angular zone of the drum where the vacuum has been released, as conventional.

Turning now to FIG. 2, uniformly perforated shower roll 22, typically of stainless steel, is centrally and longitudinally traversed by hollow shower pipe 24, the latter having threaded ends 38 which extend beyond the shower roll ends. The perforations in roll 22 are indicated as 25 in FIG. 4. A series of uniformly spaced and aligned water exit slits 32 is provided along shower pipe 24. Slits 32 are uniformly spaced along the length of the pipe. The lowest part of the pipe carries a radially extending elongated metal sheet 34 which functions as a dam for the wash water. Shower roll 22 is freely rotatable relative to pipe 24 on which it is mounted.

FIG. 3 shows the upper longitudinal edge of dam 34 rigidly secured as by welding to the lower exterior surface of pipe 24 and extending substantially vertically downwardly so that its lower longitudinal edge is near and parallel to the lower interior surface of shower roll 22. In practice, dam 34 is tilted slightly forwardly by an angle 35 of about 5 degrees. Slits 32 are arranged at a 1:30 angular position, but this is not critical.

FIG. 4 is an enlarged sectional view of the left end of FIG. 2 and illustrates one manner of freely rotatably securing shower roll 22 to pipe 24. A rotatable bearing assembly includes bearing housing 40 and is axially located between one end closure 42 of apertured shower roll 22 and a locking collar 44. Notch 46 is cut at each end of the dam to accommodate nuts and bolts which couple housing 40 to end wall 42. The bearing includes bushing 47 and sleeve 49. Is understood that the other end of roll 22 and pipe 24 is of the same construction. The specific bearing construction shown at FIG. 4 is not necessary to carry out this invention.

Figure 5:
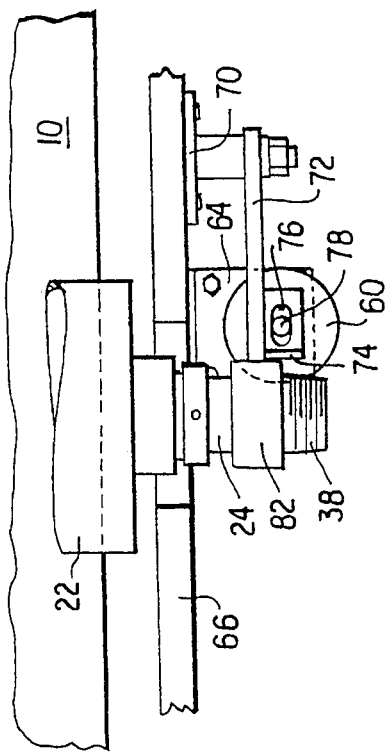
FIG. 5 is an end view of the shower roll shown at the top of FIG. 1.

FIG. 5 is an end view of the shower roll, pipe, and bearing assembly, as looking from left to right of the construction shown at FIG. 4. A wire mesh 23, similar to wire mesh 23 of the drum 10 and also partially shown, surrounds the exterior surface of roll 22. This mesh contacts the pulp cake and thus rotates shower roll 22 with rotation of the vacuum drum.

Figure 6:
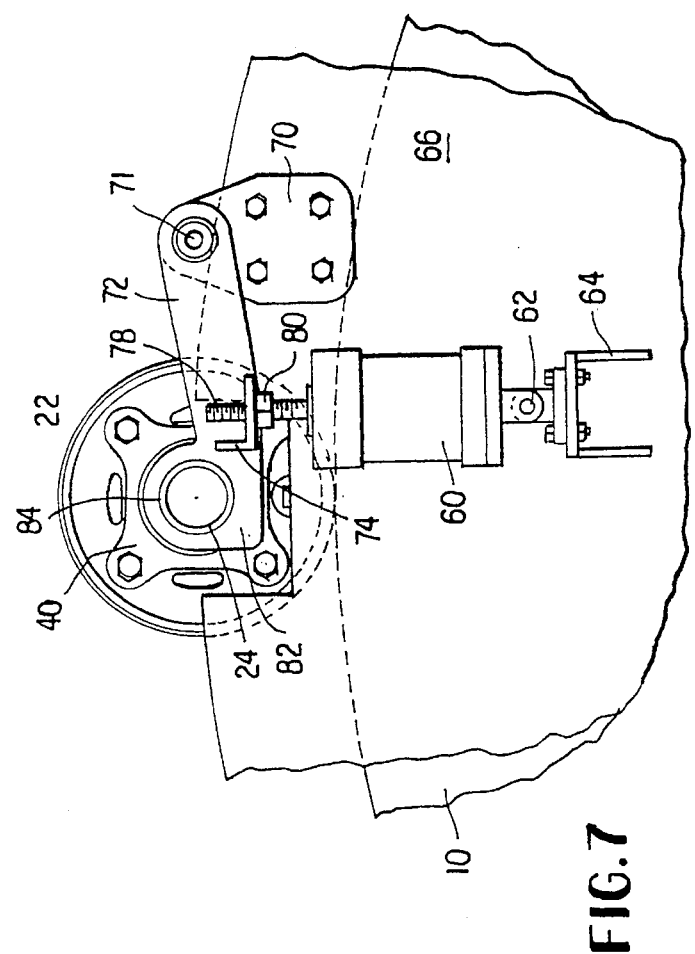
FIG. 6 is a partial top view of one end of the shower roll and vacuum drum shown at FIG. 1.
Figure 7:
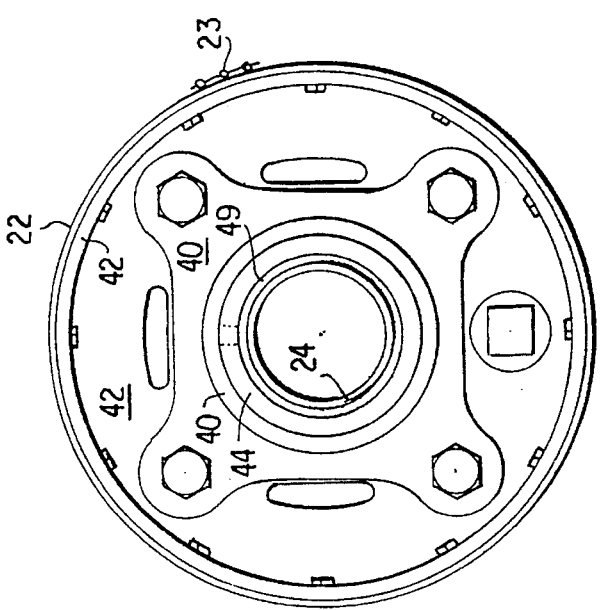
FIG. 7 is a side elevational view of the elements of FIG. 6.

FIGS. 6 and 7 illustrate one manner of mounting the shower roll on a vacuum drum apparatus. Each of a pair of air cylinders 60 is mounted at opposite ends of the shower roll, each cylinder lower end attached in a pivot 62, the latter mounted on a bracket 64. In turn, brackets 64 (one at each end of the vacuum drum apparatus) are each mounted on conventional side or splash panels 66, the latter similar to splash panels 56 and 58 of the noted Lenac patent. A bracket 70, also mounted on panel 66, is pivoted at 71 to the right end of arm 72. An intermediate portion of arm 72 carries an L shaped bracket 74, secured to one side of arm 72 as by welding. Bracket 74 is apertured at 76, the aperture receiving rod 78 of air cylinder 60. One or more nuts 80 surround rod 78 beneath the L bracket. The left end 82 of arm 72 is provided with an opening 84 which receives an end of pipe 24.

In operation, roll 22 is allowed to softly nip pulp mat 11 with free vertical movement by virtue of the left end of arm 72 being able to freely move up and down along a vertical arc whose center is pivot 71. The initial distance of shower roll 22 to the vacuum drum surface is set by nut member 80 whose upper portion abuts the lower portion of L bracket 74 and thus determines the maximum downward movement of the shower roll, for a given position of the air cylinder piston within the air cylinder. By virtue of the apertured L bracket and air cylinder rod 78 and nut 80 arrangement, shower roll 22 is free to move upwardly if a large lump of pulp in cake 11 is encountered during operation.

Nip loading (nip pressure) can be adjusted by regulating the back pressure on the lift air cylinders 60 to set the shower drum with respect to the vacuum drum for a given thickness and type of pulp mat 11. In a typical installation, merely exemplary, the maximum nip load is about 55 pounds per linear foot (being the weight of the shower roll assembly plus linkage arms), the vacuum drum 10 can be about 8 to 13.5 feet in diameter and can be of a width of about 12 to 40 feet. The length of arm 72 is typically one foot. The shower roll has no electrical or mechanical drive and is rotated by contact with the pulp mat. Dam 34 counteracts the tendency of the water sprayed from openings 32 in pipe 24 to adhere to the shower roll interior surface by virtue of centrifugal force and thus pass beyond the 6 o'clock or nip position towards the 9 o'clock position. The dam thus functions to keep the sprayed water at the lower part of the shower roll prior to passing to the filter cake or mat 11. Typically, the dam is tilted about 5 degrees to the right, angularly upstream of the nip. This tilt helps to maintain the nip flooded. Other angular positions of the dam may be selected. The nip gap is adjusted during assembly such that no contact with the drum deck is possible. The pumping action of the nip forces cleaner water into the mat while displacing dirtier water into the drum deck.

The invention permits a reduction in drum speed, an increase in first stage displacement ratio (a general number for measuring washer stage efficiency), and an increase in first stage mat discharge consistency which means lower solids to the second stage.

We claim:

1. A rotary vacuum drum apparatus for dewatering paper pulp, said vacuum drum adapted to rotate about its longitudinal axis and having a doctor blade therearound for scraping off partially dried pulp, the improvement comprising, an elongated and hollow shower roll having a longitudinal axis and being of a width substantially the same as the width of said vacuum drum along said longitudinal axis, said shower roll being perforated so as to define liquid passages from its interior to its exterior, a shower pipe located within said shower roll, said shower pipe having a plurality of longitudinally spaced openings therealong, said shower roll being rotatable about its said longitudinal axis, whereby rotation of said vacuum drum is accompanied by rotation in the opposite direction of said shower roll, and whereby water exiting from said shower pipe is adapted to pass radially outwardly from the interior of said shower roll and onto a layer of paper pulp on the exterior surface of said vacuum drum, said shower roll adapted to compress said paper pulp along the width of said vacuum drum and simultaneously exude water to said layer of paper pulp.

2. The apparatus of claim 1 wherein said shower pipe is centrally longitudinally positioned within said shower roll.

3. The apparatus of claim 1 wherein said shower pipe is freely substantially vertically movable so as to freely move towards and away from said vacuum drum.

4. The apparatus of claim 3 including means for adjusting nip pressure between said shower roll to said vacuum drum.

5. The apparatus of claim 1 wherein said shower roll is freely rotatable.

6. The apparatus of claim 1 including a dam secured to a lowermost portion of said shower pipe, said dam extending generally vertically downwardly and being of a width substantially equal to that of said shower roll.

7. A method of dewatering a pulp mat on a vacuum drum, the method including the steps of radially compressing the pulp mat towards the vacuum drum at a zone of compression and simultaneously supplying water to the compressed pulp mat at said zone of compression wherein said step of radially compressing the pulp mat is carried out by a rotating and perforated shower roll located above said vacuum drum to thereby form a nip through which a pulp mat passes, said shower roll having a longitudinal axis, said nip forming said zone of compression, and wherein water is supplied to the pulp mat at said nip by passing radially outwardly from the interior of said shower roll through the perforations of the latter to said nip.

8. The method of claim 7 wherein water is continuously uniformly supplied to said shower roll along its interior.

9. The method of claim 7 wherein said shower roll is freely rotated about its said longitudinal axis.

* * * * *